UNITED STATES PATENT OFFICE.

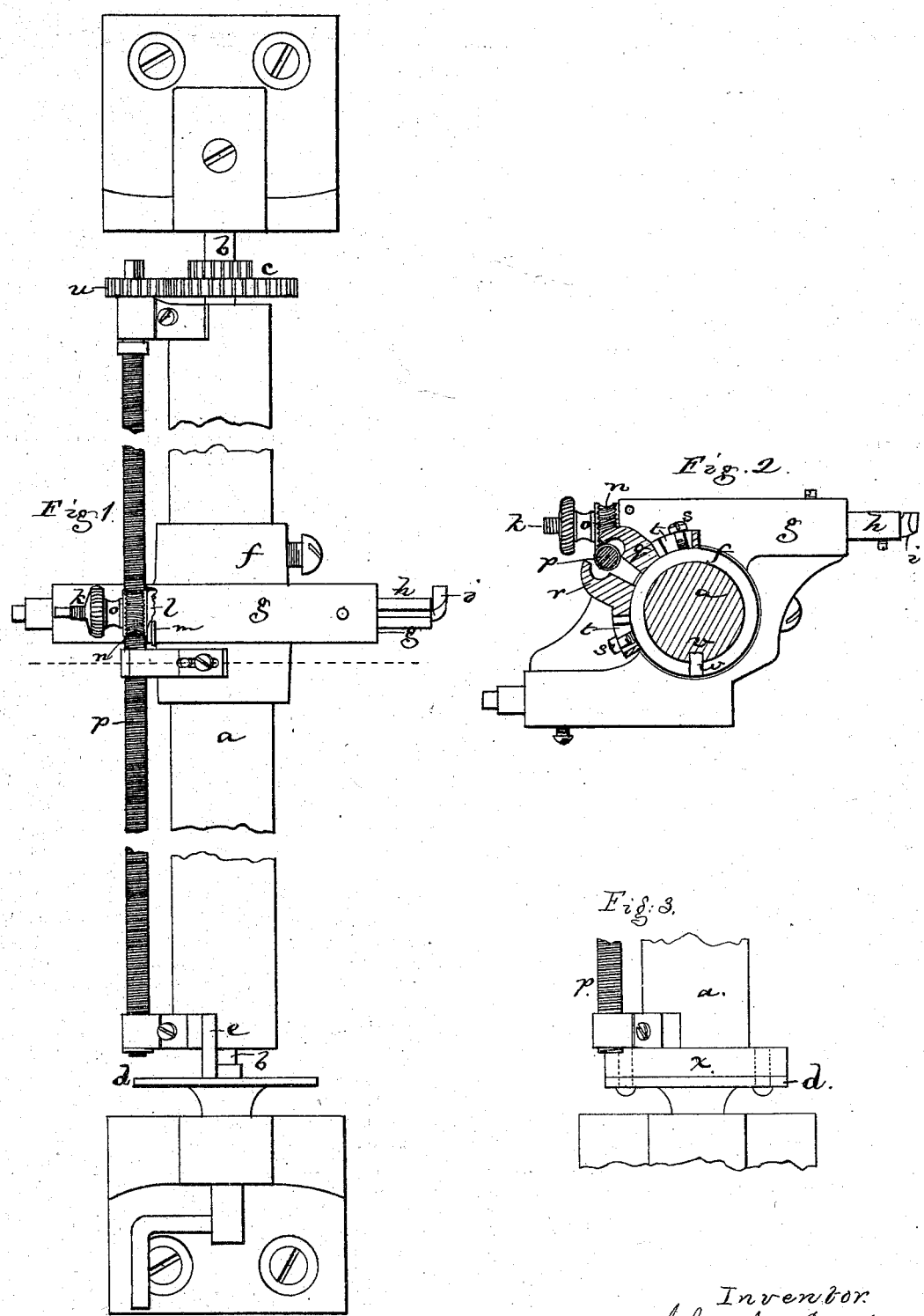

JOHN MACDONALD, OF BOSTON, MASSACHUSETTS.

IMPROVEMENT IN MACHINES FOR BORING AND FACING CYLINDERS.

Specification forming part of Letters Patent No. 143,917, dated October 21, 1873; application filed June 26, 1873.

*To all whom it may concern:*

Be it known that I, JOHN MACDONALD, of Boston, in the county of Suffolk and State of Massachusetts, have invented an Improved Tool for Boring and End-Facing Tubular Cylinders; and I do hereby declare that the following, taken in connection with the drawings which accompany and form part of this specification, is a description of my invention sufficient to enable those skilled in the art to practice it.

The invention relates to the construction of a tool for boring the inner surfaces of tubular metal cylinders, and facing the ends thereof, the invention having particular reference to an organization that permits both the inner facing and the end facing to be effected by one tool. In my invention I use, in combination with a mechanism for imparting a revolving movement and a movement of translation to the cutting-tool to carry it around within the tube and progressively through it, a mechanism for imparting lateral or radial movement to the revolving tool, the translatory or shifting movement ceasing for the radial movement, and the radial for translatory or shifting movement; and my invention consists in a tool so mounted as to be capable of these independent movements for the inner surface of the tube, and a revolving and radial movement for the end face thereof.

The drawing represents a mechanism embodying my invention.

Figure 1 shows the mechanism in plan. Fig. 2 is a section on the line *x x*.

*a* denotes a mandrel axially mounted on center pins *b*, one of which extends from a stationary gear, *c*, and the other from a rotary head, *d*, having a pin, *e*, that strikes a projection from the mandrel, causing the mandrel to be rotated with and by it. On this mandrel is an annular slide, *f*, upon one side of which is a sleeve, *g*. In this sleeve slides a tool-holder, *h*, to which the cutting-tool *i* is fastened, and this holder is made tubular and with a nut-thread, into which enters a screw, *k*. This screw passes through a head, *l*, confined by a pin, *m*, and thence through a worm-wheel, *n*, and a clamp-nut, *o*. The screw turns freely in the gear, (which is nut-screw threaded,) when the gear is loose; but when the clamp-nut *o* is tightened the wheel is forced up against the head *l* and head, wheel, screw, and clamp-nut turn as one. The worm-wheel has a screw-thread meshing into the thread of a long feed-screw, *p*, and to the slide *f* are attached jaws *q r*, each having a half-nut, these jaws being fastened by screws *s* extending through slots *t*, and the slots and nuts enabling the jaws to be clamped against the screw, or drawn back therefrom. The screw *p* turns in suitable bearings at its opposite ends, and at one end it carries a pinion, *u*, that meshes into the gear, rotation of the mandrel imparting rotation to the pinion, and axial rotation to the screw, upon which the pinion is fixed. When the nut *o* is loosened and the half-nuts *q r* are against the screw, rotation of the mandrel rotates with it the slide *f* and its cutter, and causes the feed-screw *p* to rotate axially as well as with the mandrel, and by these movements the cutter travels in a circular path, and at the same time progresses endwise through the cylinder, through which the mandrel extends, the movement of the cutter being, in fact, a spiral movement. When the end of the tube is reached the half-nuts *q r* are drawn back, and the nut *o* is clamped against the worm-wheel *n*. The rotation of the mandrel and consequent rotation of the feed-screw *p* will then impart to the cutter a revolving movement in one path or not spirally, and a lateral or radial movement, causing the cutting-edge to act against the end face of the tube, the inner tubular face of which has been turned down by the spiral movement of the tool. For imparting more or less rapid rotation to the screw to increase either the end movement or the lateral movement of the tool, there may be several gears fixed on the end of the mandrel, and removable gears to apply interchangeably to the end of the screw to connect with either of the mandrel-gears. To gripe the slide *f* the mandrel has a slot, *v*, into which a tooth, *w*, extends from the slide. Instead of the feed-screw *p* to effect the end movement of translation of the cutter in the tube, the cylinder itself may have this movement, a screw-shaft with a short screw serving to actuate the worm-wheel *n*.

By this invention it will be readily seen that with the same tool and the same organization of mechanism, the tool may have the successive movements requisite for turning down the inner surface of the tube and facing the end thereof.

A flange, $x$, as seen in Fig. 3, may be attached to the mandrel and bolted to the face-plate $d$ to support the mandrel in position.

I claim—

In combination with the cutting-tool, the mechanism, substantially as described and shown, for imparting to it successively revolving and shifting movements and revolving and radial movements, for the purposes set forth.

JOHN MACDONALD.

Witnesses:
 FRANCIS GOULD,
 M. W. FROTHINGHAM.